(12) United States Patent
Morin (10) Patent No.: US 11,154,826 B2
(45) Date of Patent: Oct. 26, 2021

(54) MIXING PADDLE FOR APPLIANCE FOR PREPARING ANIMAL FEED, AND METHOD FOR PREPARING ANIMAL FEED

(71) Applicant: SEB S.A., Ecully (FR)

(72) Inventor: Gilles Morin, Varois et Chaignot (FR)

(73) Assignee: SEB S.A., Ecully (FR)

( * ) Notice: Subject to any disclaimer, the term of this patent is extended or adjusted under 35 U.S.C. 154(b) by 327 days.

(21) Appl. No.: 16/303,572

(22) PCT Filed: May 22, 2017

(86) PCT No.: PCT/FR2017/051258
§ 371 (c)(1),
(2) Date: Nov. 20, 2018

(87) PCT Pub. No.: WO2017/203149
PCT Pub. Date: Nov. 30, 2017

(65) Prior Publication Data
US 2020/0316537 A1 Oct. 8, 2020

(30) Foreign Application Priority Data
May 23, 2016 (FR) ...................... 1654599

(51) Int. Cl.
*B22C 5/00* (2006.01)
*B01F 7/00* (2006.01)
(Continued)

(52) U.S. Cl.
CPC .......... *B01F 7/0065* (2013.01); *B01F 3/1221* (2013.01); *B01F 7/0005* (2013.01);
(Continued)

(58) Field of Classification Search
CPC .... B01F 7/0065; B01F 7/1221; B01F 7/0005; B01F 7/00; B01F 7/02; B01F 7/04; B01F 7/08; B01F 15/027
See application file for complete search history.

(56) References Cited

U.S. PATENT DOCUMENTS 8,511,519 B2 8/2013 Mahle et al.
2006/0268659 A1 11/2006 Kaas
2011/0212207 A1* 9/2011 Voyatzakis ............. A21C 7/005
425/332

FOREIGN PATENT DOCUMENTS

EP 0 809 934 A2 12/1997
EP 2 781 254 A1 9/2014
(Continued)

OTHER PUBLICATIONS

"Klemens Kohlgruber, Dynamic Mixer, Apr. 16, 2009" (machine translation of the description [labeled as ES2316762T3_MT_desc_en]) (Year: 2009).*
(Continued)

*Primary Examiner* — Anshu Bhatia
*Assistant Examiner* — Gregory Y Huan
(74) *Attorney, Agent, or Firm* — Pillsbury Winthrop Shaw Pittman LLP (57) ABSTRACT

A mixing paddle that is configured to rotate about a horizontal rotation axis and includes at least one eccentric arm which includes a first portion inclined with respect to a plane containing the rotation axis, so as to cause the ingredients contained in the mixing chamber to move in a first axial direction when the mixing paddle rotates in a first direction of rotation, a second portion having a cross section oriented radially with respect to the rotation axis in order, when the mixing paddle rotates in a second direction of rotation, to
(Continued)

bring about a radial movement of the ingredients towards the outside of the mixing chamber.

19 Claims, 8 Drawing Sheets (51) Int. Cl.
 B01F 3/12 (2006.01)
 B01F 7/08 (2006.01)
 B01F 15/02 (2006.01)
 B01F 15/00 (2006.01)
(52) U.S. Cl.
 CPC ...... *B01F 7/00208* (2013.01); *B01F 7/00441* (2013.01); *B01F 7/08* (2013.01); *B01F 15/027* (2013.01); *B01F 2015/00642* (2013.01); *B01F 2215/0024* (2013.01)

(56) References Cited

FOREIGN PATENT DOCUMENTS

| EP | 2 990 373 A1 | 3/2016 | |
|---|---|---|---|
| ES | 2316762 T3 * | 4/2009 | ............ B01F 7/1665 |
| GB | 2 313 997 A | 12/1997 | |
| WO | WO-2006113446 A1 * | 10/2006 | ............... A21D 8/06 |
| WO | WO-2007007202 A2 * | 1/2007 | .......... B01F 7/00583 |
| WO | WO 2014/170450 A1 | 10/2014 | |

OTHER PUBLICATIONS

International Search Report as issued in International Patent Application No. PCT/FR2017/051258, dated Oct. 6, 2017.

* cited by examiner

MIXING PADDLE FOR APPLIANCE FOR PREPARING ANIMAL FEED, AND METHOD FOR PREPARING ANIMAL FEED

CROSS-REFERENCE TO RELATED APPLICATIONS

This application is the U.S. National Stage of International Application Serial No. PCT/FR2017/051258, filed May 22, 2017, which in turn claims priority to French Application No. 1654599, filed May 23, 2016. The contents of all of these applications are incorporated herein by reference in their entirety.

This invention concerns in general a mixing paddle designed to be received in a mixing chamber of an appliance for preparing animal feed. The invention also concerns a method for mixing animal feed and an appliance for preparing animal feed.

Devices for preparing feed for domestic animals are known in the prior art, such as the one described in the document U.S. Pat. No. 8,511,519B2, for example. On the other hand, this system has in particular the disadvantage of offering feed only in solid form, which may not be suitable for certain animals.

One goal of this invention is to respond to the aforementioned disadvantages of the prior art and in particular, first of all, to propose a mixing paddle to be received in a mixing chamber of an appliance for preparing animal feed, which allows a dehydrated feed to be mixed with a liquid, but without making the preparation appliance more complex.

To achieve this, a first aspect of the invention concerns a mixing paddle designed to be received in a mixing chamber of an animal feed preparation appliance in order to mix in it ingredients such as a serving of a dehydrated feed with a liquid, the mixing paddle being designed to rotate about a horizontal rotation axis, and comprising at least one eccentric arm with respect to the rotation axis, characterized in that the said at least one eccentric arm comprises:
 a first portion inclined with respect to a plane containing the rotation axis, so as to cause the ingredients contained in the mixing chamber to move in a first axial direction when the mixing paddle rotates in a first direction of rotation,
 a second portion arranged upstream of the first portion with respect to the first axial direction, having a cross section oriented radially with respect to the rotation axis in order, when the mixing paddle rotates in a second direction of rotation, to bring about a radial movement of the ingredients contained in the mixing chamber towards the outside of the mixing chamber, these ingredients then being returned towards the second portion by the first portion. The mixing paddle according to this implementation allows two different functions to be performed, in addition to being able to mix the ingredients: in a first direction of rotation, the mixing paddle makes it possible, with its first portion, to push or displace the ingredients in a first axial direction (defined by the rotation axis of the mixing paddle), and a in a second direction of rotation, the mixing paddle makes it possible, with its second portion, to expel the ingredients towards the outside in a radial direction, while the first portion brings about a movement in a direction opposite the first direction, since the mixing paddle rotates in a direction opposite the first direction of rotation. In the second direction of rotation, the mixing paddle returns the ingredients toward the second portion with the first portion, forcing them to move towards the outside of the mixing chamber.

In other words, if the mixing chamber is elongated with a first closed extremity and a second extremity with a radial opening, then the mixing chamber, by rotating in the first direction of rotation, will with the first portion guide or push towards the first extremity the ingredients introduced through the opening at the second extremity. Then, by imposing on the mixing paddle a second direction of rotation opposite the first direction of rotation, the first portion will bring about a movement of the feed from the first extremity towards the second extremity, and the second portion will then push the feed radially towards the outside by means of the mixing chamber opening.

Advantageously, the first portion of the mixing paddle is on the side of the first extremity of the mixing chamber, and the second portion is on the side of the second extremity of the mixing chamber.

Advantageously, the second portion and/or the first portion is arranged to scrape the mixing chamber. The mixing paddle according to this implementation avoids leaving ingredients on the wall of the mixing chamber.

Advantageously, the second portion comprises a flexible part. Such a flexible part prevents trapping or blockages if there are granules or solid parts in the mixing chamber.

Advantageously, the flexible part is made of silicone. Such a material is well suited to the constraints of food.

Advantageously, the first portion has an elongated cross section whose length is normal to the direction of travel of the first portion. This implementation allows the ingredients to be mixed efficiently.

Advantageously, the second portion is parallel to a plane containing the rotation axis.

Advantageously, the mixing paddle comprises two eccentric arms.

Advantageously, the mixing paddle comprises at least one radial tab attaching the two eccentric arms. This radial tab limits the deformations of the mixing paddle, and reduces the risk of trapping.

Advantageously, the mixing paddle comprises two anchorages on the mixing chamber and a longitudinal tab attaching the two anchorages. This axial tab limits the deformations of the mixing paddle, and reduces the risk of trapping.

Advantageously, the first and the second portions are arranged between the two anchorages.

Advantageously, one of the anchorages is designed to attach to a driver connected to a motor of the preparation appliance.

Advantageously, the first portion has a helical shape.

Advantageously, the said at least one eccentric arm has a cross section whose length is less than or equal to 12 mm, and preferably less than or equal to 10 mm. This implementation limits fouling of the mixing paddle.

A second aspect of the invention concerns a method for preparing animal feed comprising the following steps:
 introduce ingredients, such as a serving of a dehydrated feed and a liquid, to a mixing chamber;
 move the ingredients contained in the mixing chamber in a first axial direction and mix them with a mixing paddle rotating about a rotation axis;
 move the ingredients contained in the mixing chamber in a second axial direction opposite the first axial direction with the mixing paddle;
 expel the ingredients contained in the mixing chamber in a radial direction, with the mixing paddle.

Advantageously, the ingredients are introduced through an opening of the mixing chamber.

Advantageously, the movement of ingredients in the first direction moves the ingredients away from the opening through which the ingredients are introduced. The mixing paddle then rotating about the rotation axis in a first direction of rotation.

Advantageously, the feed is introduced and the ingredients are moved at least partly simultaneously. This prevents the opening from being blocked, and allows uniform filling of the mixing chamber.

Advantageously, the movement of ingredients in the second direction moves the ingredients closer to the opening through which the ingredients were introduced. The mixing paddle then rotating about the rotation axis in a second direction of rotation.

Advantageously, between the ingredient introduction step and the feed expulsion step, the method includes a step of moving the mixing chamber in order to make the opening change from a high position to a low position in relation to the mixing chamber.

A third aspect of the invention concerns an appliance for preparing animal feed comprising a mixing paddle according to the first aspect of the invention, and/or designed to implement the method according to the second aspect of the invention.

Other characteristics and advantages of this invention will be seen more clearly by reading the following detailed description of an embodiment of the invention, provided as a non-restrictive example, and illustrated by the attached drawings in which:

FIG. 5b represents a pot forming a part of the mixing chamber of FIG. 5a;

FIG. 6 represents a perspective view of an animal feed preparation appliance according to this invention accommodating the mixing chamber of FIG. 5a;

FIG. 8 represents a perspective view of the bottom of a housing shown in FIG. 5a;

FIGS. 6, 10, 11 and 12 represent general views of a preparation appliance 500 according to this invention, which comprises a main body supported by a bracket 401, which also supports a consumption container 400 (such as a bowl, for example).

Figure 10:
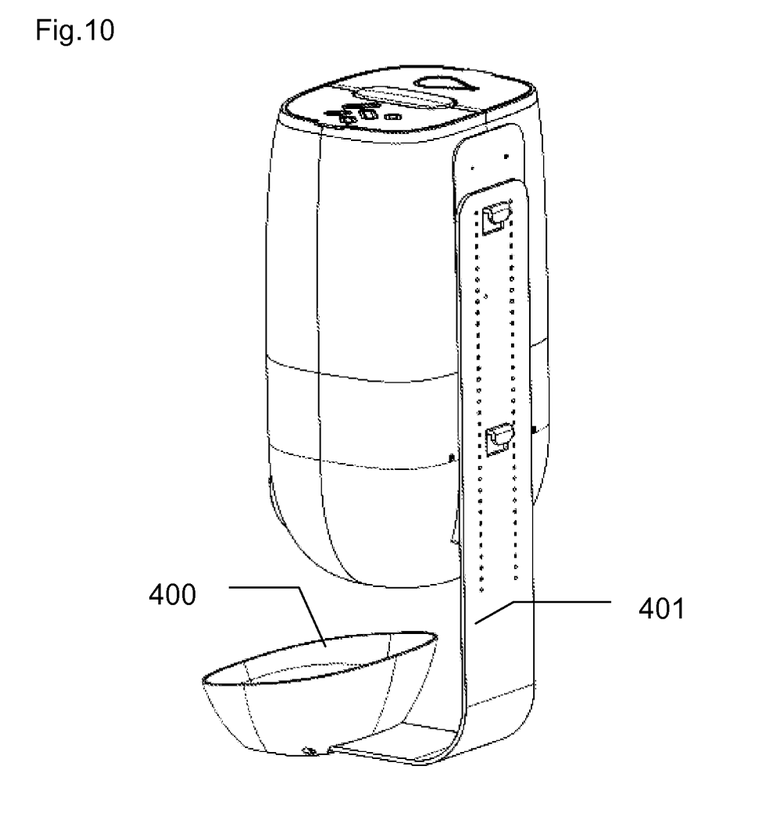
FIG. 10 represents a view of the back of the preparation appliance of FIG. 6.

FIG. 10 shows that the main body may be positioned at different altitudes with respect to the bracket 401, so as to be able to adjust a height between the main body and the consumption container 400, depending on the size of the animal to be fed. For this purpose, a plurality of holes are provided in the bracket 401, in order to be able to screw it at the appropriate height in tapped holes in the main body. As for the bracket 401, it is fixed to a wall, for example, in order to hold the preparation appliance 500 and the consumption container 400 in place.

Figure 11:
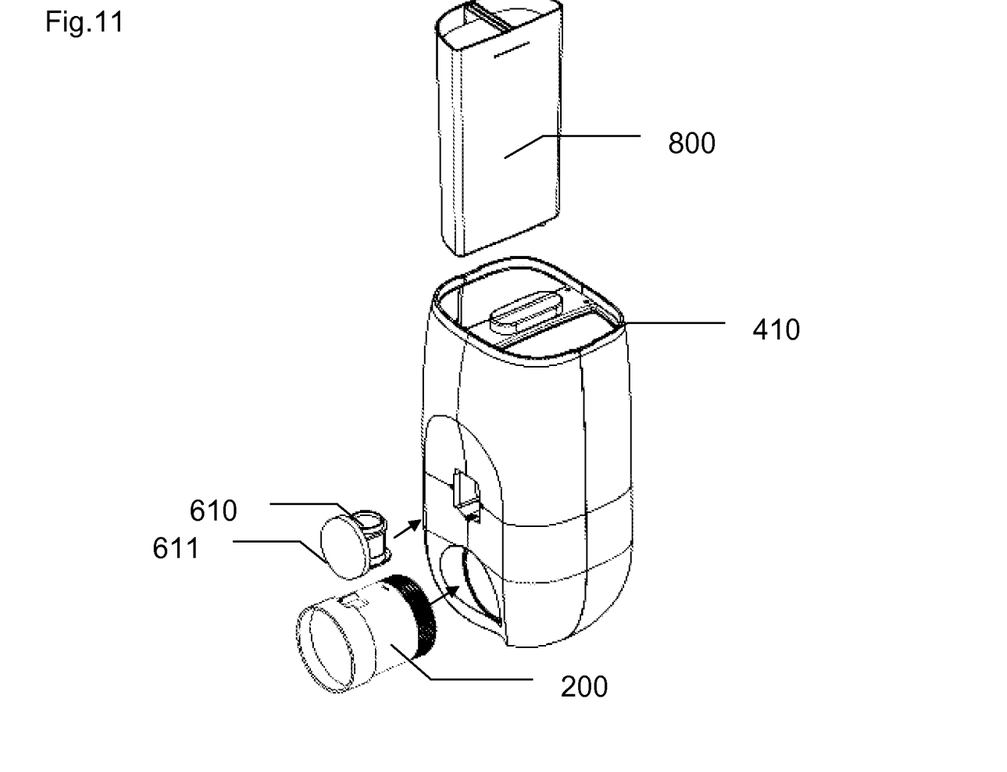
FIG. 11 represents an exploded view of the preparation appliance of FIG. 6.

FIG. 11 shows that the preparation appliance 500 may removably receive several elements including a liquid reservoir 800, a removable cartridge 610 and a mixing chamber 200 in which at least one liquid (such as water, for example) and a dehydrated feed are mixed in order to form a feed ration in mash form that will then be dispensed into the consumption container 400. A tray 410 is also provided in the body of the preparation appliance 500, to serve as storage means for the dehydrated feed.

Figure 12:
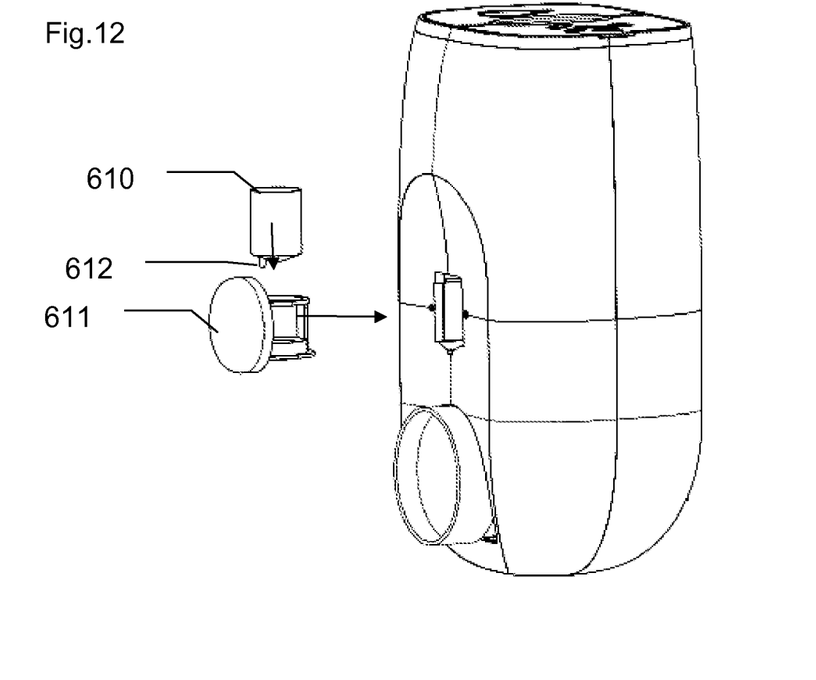
FIG. 12 represents a view detailing a removable cartridge of the preparation appliance of FIG. 6.

The preparation appliance 500 can also removably receive the removable cartridge 610 and its support 611, whose very simple assembly is shown in FIG. 12. In fact, the removable cartridge 610, which contains a food supplement to be included in the ingredients to be mixed if needed, may be mounted in its support 611, and the subassembly is then snap-fitted or inserted into the main body of the preparation appliance 500, above the mixing chamber, so that a defined quantity of food supplement can easily be included in the animal's feed ration, as will be explained later.

Figure 1:
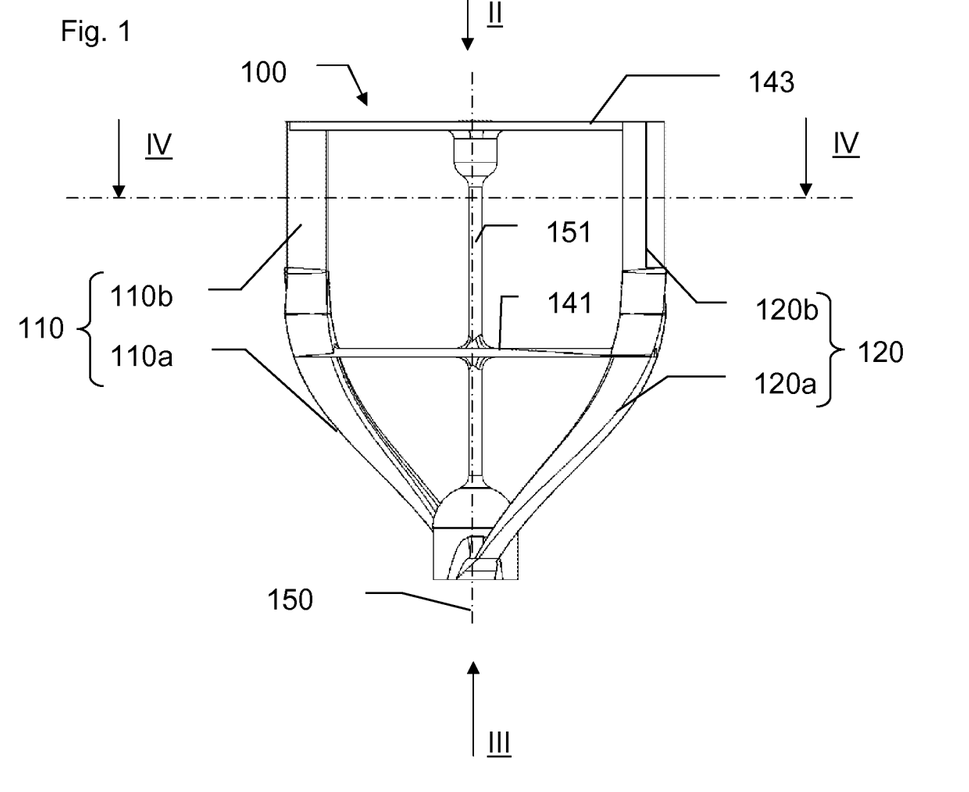
FIG. 1 represents a side view of a mixing paddle designed to be received in a mixing chamber of a preparation appliance according to this invention.

FIG. 1 represents a mixing paddle 100 designed to be received in the mixing chamber 200 of the preparation appliance 500 according to this invention, which comprises a first eccentric arm 110 and a second eccentric arm 120, both of them eccentric with respect to a rotation axis 150, about which the mixing paddle rotates when it is used in the animal feed preparation appliance 500.

In fact, the mixing paddle 100 is designed to be received in the mixing chamber 200 (visible in FIGS. 5a, 6, 7 and 11) of the animal feed preparation appliance 500 (visible in FIG. 6), in order to mix ingredients in it such as a serving of dehydrated feed with a liquid. For this purpose, it is envisioned to drive the mixing paddle 100 in rotation about the rotation axis 150, in order first to mix the dehydrated feed with a liquid such as water, and then to knead this mixture to obtain a homogeneous paste, and then dispense the paste into the consumption container 400 (visible in FIG. 6) accessible to the animal so that he can consume this freshly prepared mash.

To return to FIG. 1, each eccentric arm 110 and 120 comprises a first portion 110a and 120a, respectively, inclined with respect to a plane containing the rotation axis 150, so as to cause the ingredients contained in the mixing chamber to move in a first axial direction (the direction II in FIG. 1) when the mixing paddle rotates in a first direction of rotation. Advantageously, the first portions 110a and 120a are helical in shape in order to form a portion of a screw conveyor. In this way, when the paddle rotates in a second direction of rotation opposite the first direction of rotation, the first portions 110a and 120a cause the ingredients contained in the mixing chamber to move in a second axial direction, the direction III in FIG. 1.

In addition, each eccentric arm 110 and 120 comprises a second portion 110b and 120b, respectively, arranged upstream of the first portion 110a and 120a with respect to the first axial direction II, having a cross section oriented radially with respect to the rotation axis 150 in order, when the mixing paddle 100 rotates in a second direction of rotation, to bring about a radial movement of the ingredients contained in the mixing chamber 200 towards the outside of the mixing chamber 200, these ingredients then being returned towards the second portion 110b and 120b by the first portion 110a and 120a.

In fact, the invention proposes to make the mixing paddle 100 rotate in two contrary directions of rotation, depending on the result to be achieved, as is explained below.

Figure 5A:
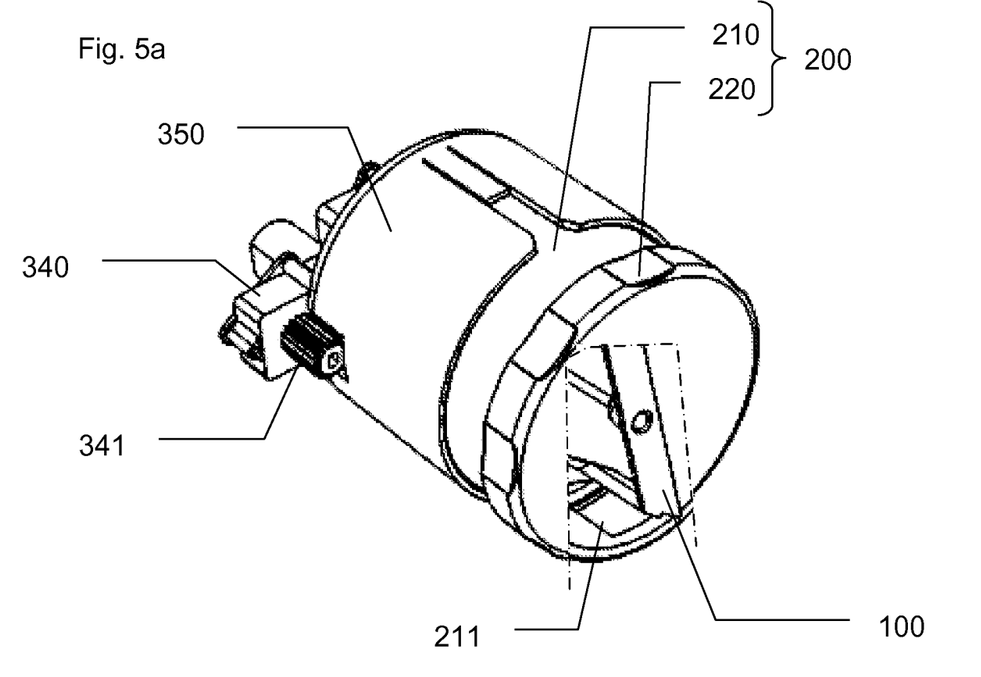
FIG. 5a represents the mixing paddle of FIG. 1 placed in the mixing chamber of the preparation appliance according to this invention.
Figure 5B:
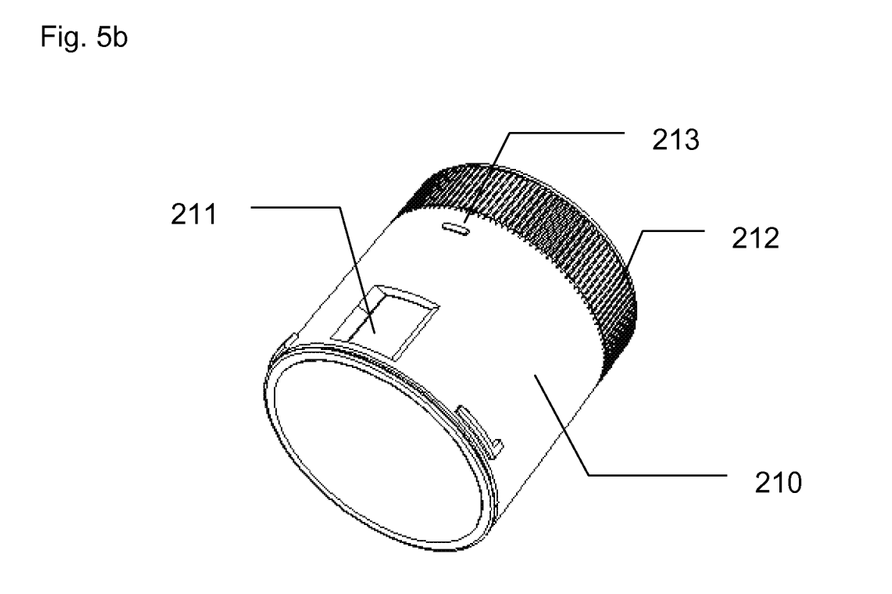
Figure 6:
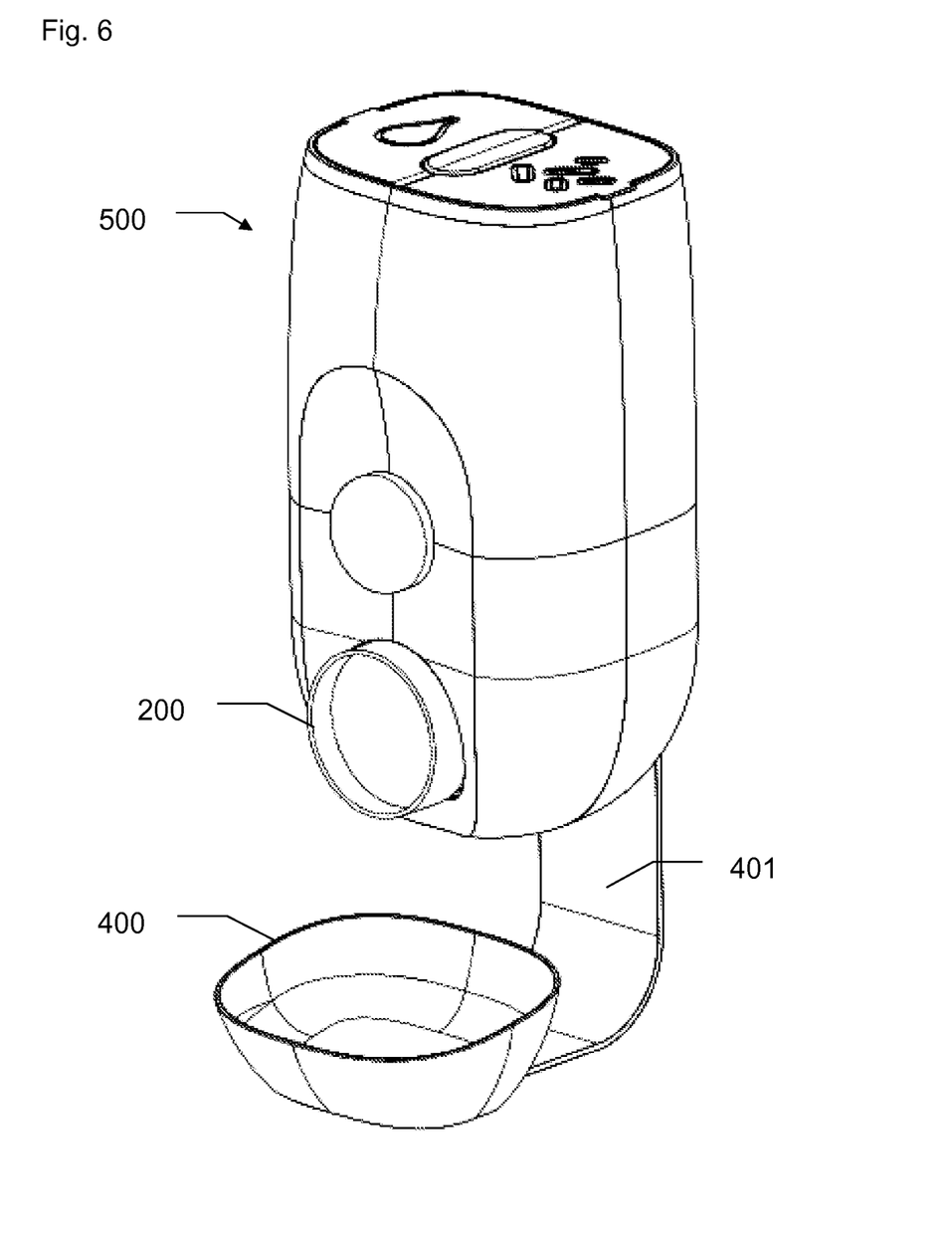

As shown in FIG. 5a, the mixing chamber 200 comprises a pot 210 closed with a cover 220, the mixing paddle 100 being arranged inside the pot 210 closed with the cover 220. The mixing chamber 200 also comprises an opening 211 shown through the cover 220 in a partial cross section. As seen in FIGS. 5a and 5b, the opening 211 is formed in the pot, but it would be possible to envision establishing the opening 211 in the cover.

The preparation appliance 500 comprises a geared motor 340 with a pinion 341 which can cause the mixing chamber 200 to pivot when it is placed in a housing 350 of the preparation appliance 500. In the rest of the presentation, the bottom of the pot 210 will be considered to form a first extremity of the mixing chamber 200, and the cover 220 is then placed at a second extremity of the mixing chamber 200.

In a first position, the mixing chamber 200 is placed in the housing 350 with the opening 211 at the top of the mixing chamber 200, such that the ingredients (the dehydrated feed, the liquid and possibly a food supplement) fall by gravity into the mixing chamber 200, thus on the side of the second extremity.

During a first preparation phase, it is thus envisioned to make the mixing paddle 100 rotate in a first direction of rotation so that the ingredients are pushed or displaced by the first portions 110a and 120a towards the first extremity of the mixing chamber 200 (thus according to the direction II of FIG. 1) to prevent an accumulation of ingredients at the opening 211.

This first preparation phase may last several minutes, the time for pushing the ingredients towards the bottom of the pot 210 and mixing them and kneading them to obtain a homogeneous paste or mash ready to be consumed by the animal. It could also be envisioned to temporarily interrupt the rotation to allow the liquid to penetrate the dehydrated feed properly. To effectively mix the ingredients, the first portions 110a and 120a have an elongated cross section which is substantially perpendicular to their direction of travel, but the length of this cross section is limited to 12 mm, for example, and more particularly to 10 mm, to prevent any fouling around the mixing paddle. In addition, this cross section may have a minimum surface area of 20 mm², which provides it with adequate strength.

The mixing paddle 100 can be made of acrylonitrile butadiene styrene or ABS, polyoxymethylene (or polyformaldehyde), abbreviated POM, or polyamide, abbreviated PA. Of course, one could envision adding reinforcing fibers to the material.

A second preparation phase can then begin, in order to dispense the mash in the consumption container 400. For this purpose, the geared motor 340, by means of the pinion 341 which engages with a toothed portion 212 of the pot 210 (visible in FIG. 5b), causes the mixing chamber 200 to pivot in the housing 350, in order to bring the opening 211 to the bottom of the mixing chamber.

At this moment, by causing the mixing paddle 100 to rotate in a second direction of rotation (opposite the first direction of rotation of the first preparation phase), the ingredients are then brought by the first portions 110a and 120a towards the second extremity of the mixing chamber, that is, towards the second portions 110b and 120b, situated opposite the opening 211.

Figure 4:
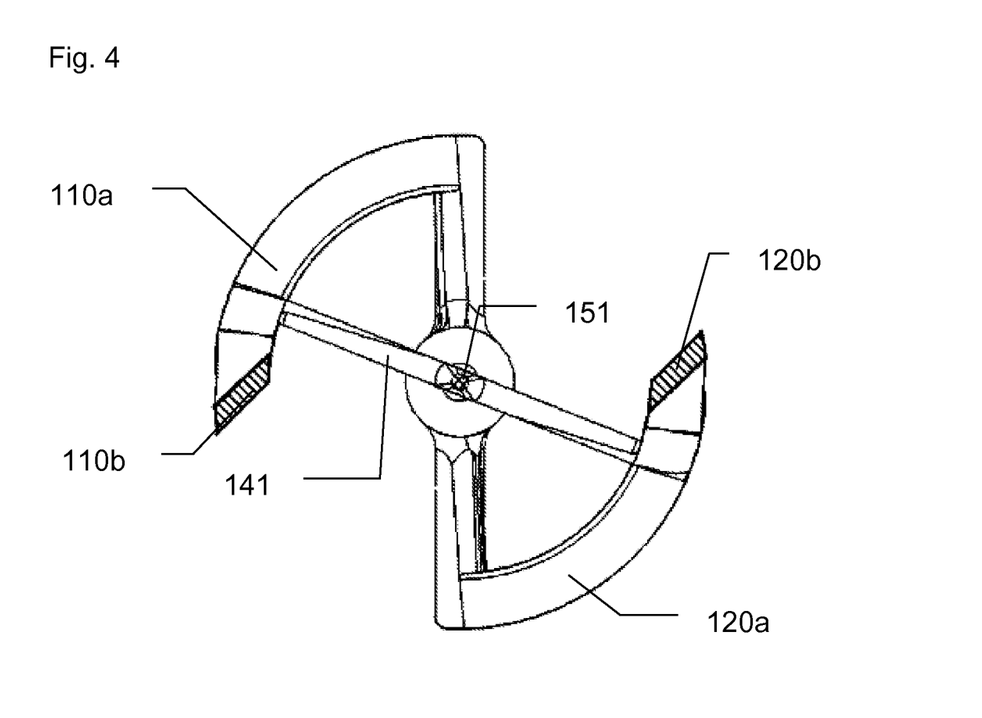
FIG. 4 represents a cross section of the mixing paddle of FIG. 1, according to the axis IV-IV of FIG. 1.

The oriented cross section of the two portions 110b and 120b, as can be seen in FIG. 4, then has the effect of pushing the ingredients towards the outside of the mixing chamber, in this way causing the mash to pass through the opening 211, and then to fall by gravity into the consumption container 400 situated just beneath. The length of the second portions 110b and 120b is calculated so that at least a part of these second portions 110b and 120b is opposite the opening 211.

When it turns in the first direction of rotation, the mixing paddle 100 thus has the effect of displacing the ingredients towards the first extremity of the mixing chamber 200 and mixing them there, and when it rotates in the second direction of rotation, the mixing paddle 100 thus has the effect of displacing the ingredients towards the second extremity of the mixing chamber 200 and pushing them through the opening 211.

As seen in FIG. 5a, the second portions 110b and 120b are adjusted to the diameter of the pot 210, and in order to limit the risks of trapping if there are granules or solid particles in the mash between the mixing paddle 100 and the pot 210, it is envisioned that the second portions 110b and 120b are at least partly flexible, to be able to change shape, and "pass above these granules or solid particles." A silicone part on the second portions 110b and 120b can therefore be envisioned.

Figure 2:
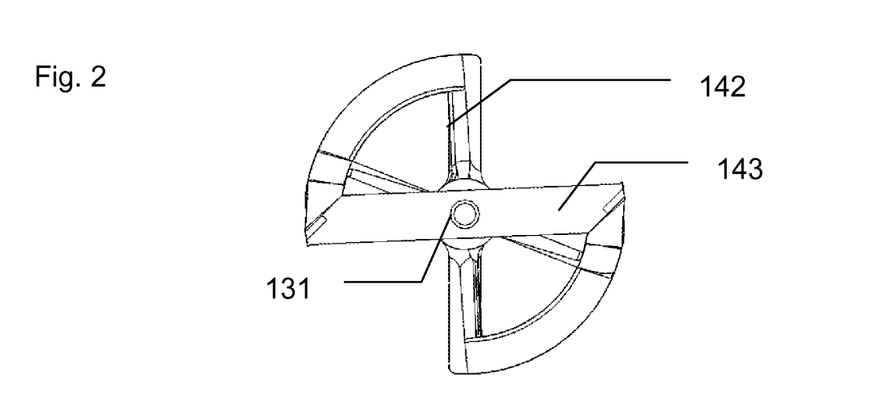
FIG. 2 represents the mixing paddle of FIG. 1, seen according to the direction II of FIG. 1.
Figure 3:
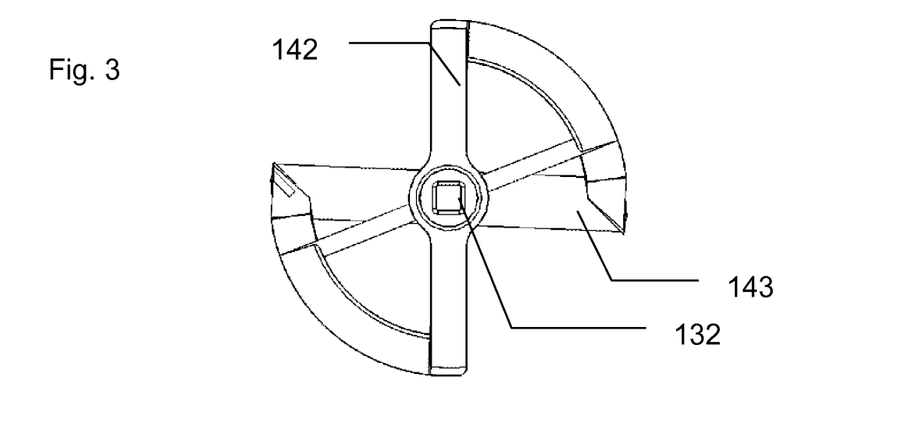
FIG. 3 represents the mixing paddle of FIG. 1, seen according to the direction III of FIG. 1.

As represented on FIGS. 1, 2 and 3, the mixing paddle 100 comprises connecting tabs between the eccentric arms 110 and 120 in order to ensure rigidity of the mixing paddle 100. In particular, two radial arms 142 and 143 are provided at the extremities of the mixing paddle 100, to attach the eccentric arms 110 and 120 and a central part of the mixing paddle 100.

In addition, a radial tab 141 is provided at the center of the mixing paddle 100, and a longitudinal tab 151 is provided at the rotation axis 150 to further rigidify the assembly and prevent deformations by twisting or bending, which could lead the mixing paddle 100 to become stuck in the mixing chamber 200.

FIG. 2 also shows a centering 131 (a drilling) which forms an anchorage to ensure a quality pivoting connection with the mixing chamber 200 where a corresponding pin is arranged in the cover 220.

Finally, FIG. 3 shows a square drive 132 which is designed to form another anchorage and engage with a driver of the preparation appliance 500, situated at the bottom of the housing 350. A different asymmetrical shape can be provided instead of the square drive 132 to drive the mixing paddle 100, a shape preventing rotation being sufficient.

Figure 8:
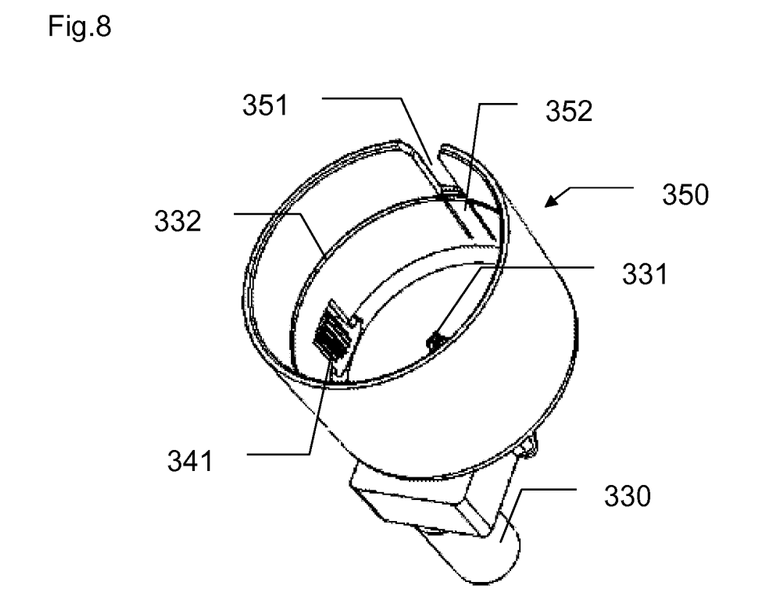

FIG. 8 represents a perspective view of the bottom of the housing 350 of the preparation appliance 500. The geared motor 340 and its pinion 341 are seen there, but also a geared motor 330 arranged to drive the mixing paddle 100 in rotation by means of a driver 331 visible at the bottom of the housing 350.

A slot 351 arranged in the cylindrical wall of the housing 350 is also seen, to allow passage of a hook 213 (visible in FIG. 5b) of the pot 210, in order to guarantee that the opening 211 is in the upper part of the mixing chamber 200, once it is put into place, or on the preparation appliance 500.

The slot 351 ends on a strip or flexible tab 352 which comprises a portion of a throat 332 arranged over 360° on the inner face of the housing 350.

When the mixing chamber is inserted on the preparation appliance 500, the hook 213 is then guided by the slot 351, and raises the flexible tab 352, to reach the throat 332. Thus, the mixing chamber is integral with the housing 350, the opening 211 being at the top. The first preparation phase may begin with supplying the ingredients by gravity into the mixing chamber 200 and mixing with the mixing paddle 100 which rotates in the first direction of rotation.

Then, the mixing paddle is stopped, and the mixing chamber 200 is pivoted by the geared motor 340 to make the opening 211 pass to the lower part of the mixing chamber 200. This movement is allowed and guided by the throat 332 which accommodates the hook 213.

The mixing chamber 200 is stopped in dispensing position, with the opening 211 in the low position, the mixing paddle may then be put into rotation according to the second direction of rotation, to expel the ingredients through the opening 211 in the form of mash. The opening has beveled edges to prevent the mash from sticking to the edges of the opening 211.

Finally, once the mixing chamber 200 is empty, the mixing paddle 100 may again be stopped, and the mixing chamber 200 may again be pivoted to return to the mixing position. A new preparation may be initiated, or the mixing chamber 200 may be removed by the user, because by seizing the outer portion of the mixing chamber 200 at the cap (the cover 220, for example), the flexible tab can release the hook 213.

Figure 7:
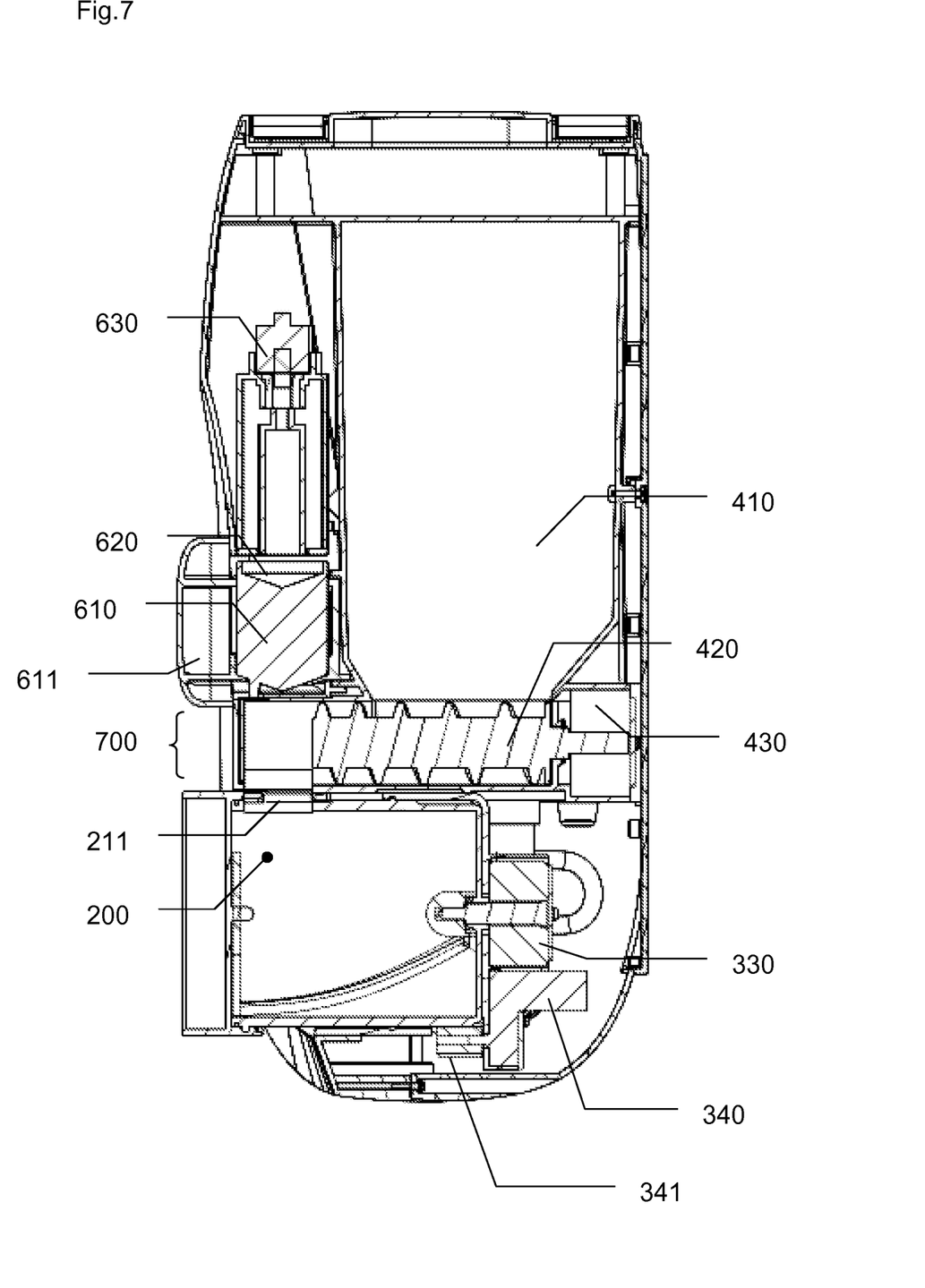
FIG. 7 represents a cross section of the animal feed preparation appliance of FIG. 6.

Again in FIG. 7, we can see the tray 410 which forms means for storing the dehydrated feed, with a screw 420, which may be a helicoidal screw, connected to an electric motor 430, which may be a geared motor. The screw 420 is thus designed to remove dehydrated feed from the tray 410, and transport it to a dispensing area 700, above the opening 211 (because the mixing chamber 200 is in the first position).

In FIG. 7, we also see the removable cartridge 610 positioned above the dispensing area 700, and containing a food supplement such as vitamins, trace elements, health products (such as a deworming product, for example), in order to personalize and tailor the feed ration to be prepared, depending on the animal's needs. The removable cartridge 610 contains a food supplement ideally in liquid or paste form, and the preparation appliance 500 comprises a motor 630 designed to move a piston 620, in order to force a predetermined amount of food supplement to fall into the mixing chamber 200.

The removable cartridge 610 is mounted on the support 611 which makes it possible to receive it and index it via an indexing pin 612 (visible in FIG. 12), in order to position it correctly in the preparation appliance 500.

As seen in FIG. 11, the preparation appliance 500 comprises the liquid reservoir 800, designed to form liquid storing means, and to store water, for example. The liquid reservoir 800 is removably mounted so that it can easily be filled, washed or dried.

Figure 9:
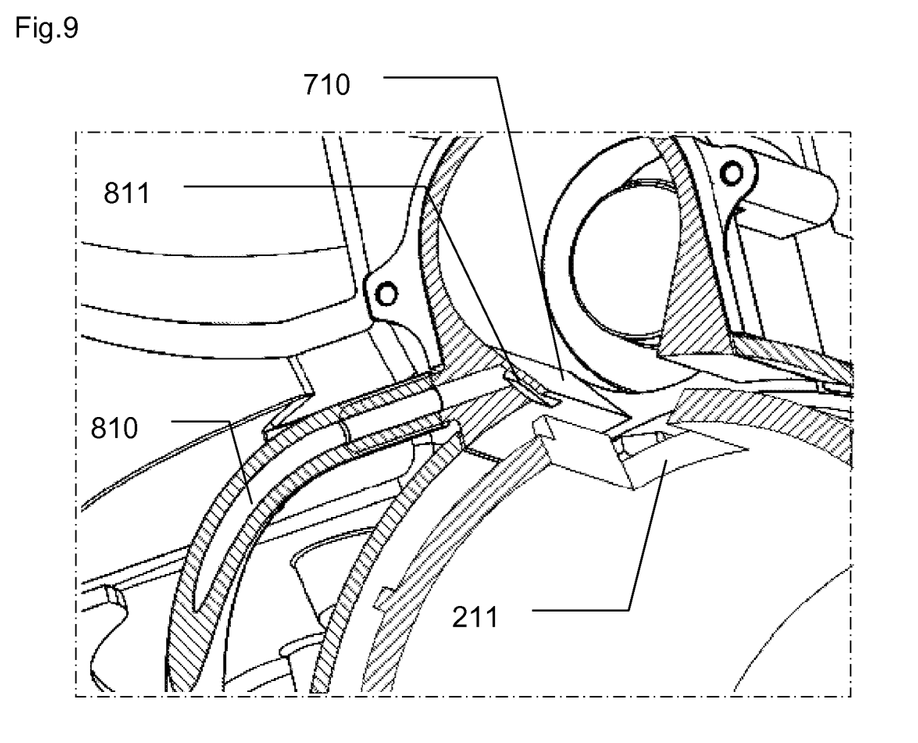
FIG. 9 represents a perspective view of a dispensing area of the preparation appliance of FIG. 6.

The liquid reservoir 800 is connected to a supply channel 810, a downstream extremity 811 of which is seen in FIG. 9. On this cross section figure, we see a part of the opening 211 and the walls 710 which define the dispensing area 700. The downstream extremity 811 of the supply channel 810 is thus positioned above the opening 211, but it is also offset in relation to the walls 710, to prevent any contact or run-off of water on the walls 710 of the dispensing area, but also with the walls of the opening 211, which will prevent the dehydrated feed from adhering to and fouling these walls. The downstream extremity 811 is thus opposite the opening 211, and it is offset in relation to the supply of dehydrated feed and food supplement so that these three ingredients can be added to the mixing chamber 200 at the same time without contact between one another, to prevent stains in the dispensing area 700, which is not removable.

It will be understood that various modifications and/or improvements obvious to the person skilled in the art may be made to various embodiments of the invention described in this description without departing from the context of the invention defined by the attached claims.

The invention claimed is:

1. An animal feed preparation appliance comprising a mixing chamber comprising an opening for receiving ingredients and a mixing paddle configured to be received in the mixing chamber in order to mix ingredients therein, the mixing paddle being configured to rotate about a horizontal rotation axis, and comprising at least one eccentric arm with respect to the horizontal rotation axis,
wherein said at least one eccentric arm comprises:
a first portion inclined with respect to a plane containing the horizontal rotation axis and extending toward the horizontal rotation axis, so as to cause the ingredients contained in the mixing chamber to move in a first axial direction when the mixing paddle rotates in a first direction of rotation, and
a second portion arranged upstream of the first portion with respect to the first axial direction and extending along said horizontal rotation axis, the second portion having a cross section oriented radially with respect to the horizontal rotation axis in order, when the mixing paddle rotates in a second direction of rotation, to bring about a radial movement of the ingredients contained in the mixing chamber towards the outside of the mixing chamber, the ingredients then being returned towards the second portion by the first portion,
wherein the mixing chamber is rotatable about the horizontal rotation axis to position the opening from a first position where the mixing chamber receives the ingredients to be mixed through said opening to a second position where the mixing chamber outputs the mixed ingredients through said opening.

2. The animal feed preparation appliance according to claim 1, wherein the second portion comprises a flexible part.

3. The animal feed preparation appliance according to claim 2, wherein the flexible part is made of silicone.

4. The animal feed preparation appliance according to claim 1, wherein the first portion has an elongated cross section whose length is normal to a direction of travel of the first portion.

5. The animal feed preparation appliance according to claim 1, wherein the second portion is parallel to a plane containing the rotation axis.

6. The animal feed preparation appliance according to claim 1, wherein the mixing paddle comprises two eccentric arms.

7. The animal feed preparation appliance according to claim 6, wherein the mixing paddle comprises at least one radial tab attaching the two eccentric arms.

8. The animal feed preparation appliance according to claim 1, comprising two anchorages and a longitudinal tab attaching the two anchorages.

9. The animal feed preparation appliance according to claim 8, wherein the first and the second portions are arranged between the two anchorages.

10. The animal feed preparation appliance according to claim 8, wherein one of the anchorages is configured to attach to a driver connected to a motor of the preparation appliance.

11. The animal feed preparation appliance according to claim 1, wherein the first portion has a helical shape.

12. The animal feed preparation appliance according to claim 1, wherein said at least one eccentric arm has a cross section whose length is less than or equal to 12 mm.

13. The animal feed preparation appliance according to claim 1, wherein the ingredients are a serving of a dehydrated feed with a liquid.

14. The animal feed preparation appliance according to claim 1, wherein said at least one eccentric arm has a cross section whose length is less than or equal to 10 mm.

15. The animal feed preparation appliance according to claim 1, wherein said mixing chamber has an inner wall extending along the horizontal rotation axis and defining an inner periphery of the mixing chamber, and
wherein said first portion of said at least one eccentric arm has a first distal end connected to the second portion and a second distal end opposite the first distal end, the first portion extending from the first distal end adjacent the inner wall of the mixing chamber to the second distal end adjacent the horizontal rotation axis.

16. The animal feed preparation appliance according to claim 1, wherein the second portion extends parallel to the horizontal rotation axis.

17. The animal feed preparation appliance according to claim 1, further comprising a geared motor and a pinion for rotating the mixing chamber between said first position and said second position.

18. A method for preparing animal feed comprising:
introducing ingredients to a mixing chamber comprising an opening for receiving ingredients;
moving the ingredients contained in the mixing chamber in a first axial direction and mixing them with a mixing paddle rotating about a horizontal rotation axis;
moving the ingredients contained in the mixing chamber in a second axial direction opposite the first axial direction with the mixing paddle; and
expelling the ingredients contained in the mixing chamber in a radial direction, with the mixing paddle,
wherein the mixing chamber is rotatable about the horizontal rotation axis to position the opening from a first position where the mixing chamber receives the introduced ingredients to be mixed through said opening to a second position where the mixing chamber expels the mixed ingredients through said opening;
wherein the mixing paddle is received in the mixing chamber and comprises at least one eccentric arm, wherein said at least one eccentric arm comprises:
a first portion inclined with respect to a plane containing the horizontal rotation axis and extending toward the horizontal rotation axis, and
a second portion arranged upstream of the first portion with respect to the first axial direction and extending along said horizontal rotation axis, the second portion having a cross section oriented radially with respect to the horizontal rotation axis.

19. The method according to claim 18, wherein the ingredients are a serving of a dehydrated feed with a liquid.

* * * * *